US007539327B2

(12) United States Patent
Toyama

(10) Patent No.: US 7,539,327 B2
(45) Date of Patent: *May 26, 2009

(54) SYSTEM AND PROCESS FOR BOOTSTRAP INITIALIZATION OF NONPARAMETRIC COLOR MODELS

(75) Inventor: Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

This patent is subject to a terminal disclaimer.

(21) Appl. No.: 11/115,781

(22) Filed: Apr. 26, 2005

(65) Prior Publication Data

US 2005/0190964 A1    Sep. 1, 2005

Related U.S. Application Data

(63) Continuation of application No. 09/592,750, filed on Jun. 13, 2000, now Pat. No. 6,937,744.

(51) Int. Cl.
*G06K 9/00* (2006.01)
(52) U.S. Cl. ............... 382/103; 382/107; 382/118; 382/163; 382/164; 382/165; 382/228; 382/291; 348/169; 348/14.1
(58) Field of Classification Search .......... 382/103, 382/107, 118, 163–165, 228, 291; 348/16.9, 348/14.1
See application file for complete search history.

(56) References Cited

U.S. PATENT DOCUMENTS 5,845,009 A * 12/1998 Marks et al. ............... 382/228

5,864,630 A * 1/1999 Cosatto et al. ............. 382/103
6,445,810 B2 * 9/2002 Darrell et al. .............. 382/115
6,502,082 B1 * 12/2002 Toyama et al. ............. 706/16

OTHER PUBLICATIONS

Koller et al. "Using learning for approximation in stochastic processes", Proceedings of the Fifteenth International Conference on Machine Learning (ICML-98), Madison, Wisconsin, Jul. 1998, pp. 287-295.*
Wren et al. "Pfinder: Real-time Tracking of the Human Body", IEEE TRansactions on Pattern Analysis and Machine Intelligence, Jul. 1997, vol. 19, No. 7.*
S. Birchfield "Ellipticla headtracking using intensity gradients and color histograms." In Proc. Computer Vision and Patt. REcog., pp. 232-237.*

* cited by examiner

*Primary Examiner*—Wesley Tucker
(74) *Attorney, Agent, or Firm*—Lyon & Harr, LLP; Mark A. Watson

(57) ABSTRACT

A system and process for automatically learning a reliable color-based tracking system is presented. The tracking system is learned by using information produced by an initial object model in combination with an initial tracking function to probabilistically determine the configuration of one or more target objects in a temporal sequence of images, and a data acquisition function for gathering observations relating to color in each image. The observations gathered by the data acquisition function include information that is relevant to parameters desired for a final color-based object model. A learning function then uses probabilistic methods to determine conditional probabilistic relationships between the observations and probabilistic target configuration information to learn a color-based object model automatically tailored to specific target objects. The learned object model is then used in combination with the final tracking function to probabilistically locate and track specific target objects in one or more sequential images.

20 Claims, 3 Drawing Sheets

SYSTEM AND PROCESS FOR BOOTSTRAP INITIALIZATION OF NONPARAMETRIC COLOR MODELS

CROSS REFERENCE TO RELATED APPLICATIONS

This application is a Continuation Application of U.S. patent application Ser. No. 09/592,750, filed on Jun. 13, 2000 by Kentaro Toyama, and entitled "A SYSTEM AND PROCESS FOR BOOTSTRAP INITIALIZATION OF NONPARAMETRIC COLOR MODELS".

BACKGROUND

1. Technical Field

The invention is related to a system and process for automatically generating a reliable color-based tracking system, and more particularly, to a system and process for using information gathered from an initial object tracking system to automatically learn a color-based object model tailored to at least one specific target object, to create a tracking system more reliable than the initial object tracking system.

2. Related Art

Most current systems for determining the presence of objects of interest in an image or scene have involved processing a temporal sequence of color or grayscale images of a scene using a tracking system. Objects are typically recognized, located and/or tracked in these systems using, for example, color-based, edge-based, shape-based, or motion-based tracking schemes to process the images.

While the aforementioned tracking systems are useful, they do have limitations. For example, such object tracking systems typically use a generic object model having parameters that roughly represent an object for which tracking is desired in combination with a tracking function such as, for example, a color-based, edge-based, shape-based, or motion-based tracking function. In general, such object tracking systems use the generic object model and tracking function to probabilistically locate and track at least one object in one or more sequential images.

As the fidelity of the generic object model increases, the accuracy of the tracking function also typically increases. However, it is not generally possible to create a single high fidelity object model that ideally represents each of the many potential derivatives or views of a single object type, such as the faces of different individuals having different skin coloration, facial structure, hair type and style, etc., under any of a number of lighting conditions. Consequently, such tracking systems are prone to error, especially where the actual parameters defining the target object deviate in one or more ways from the parameters defining the generic object model.

However, in an attempt to address this issue, some work has been done to improve existing object models. For example, in some facial pose tracking work, 3D points on the face are adaptively estimated or learned using Extended Kalman Filters (EKF) [1, 6]. In such systems, care must be taken to manually structure the EKF correctly [3], but doing so ensures that as the geometry of the target face is better learned, tracking improves as well.

Other work has focused on learning the textural qualities of target objects for use in tracking those objects. In the domain of facial imagery, there is work in which skin color has been modeled as a parametrized mixture of n Gaussians in some color space [7, 8]. Such work has covered both batch [7] and adaptive [8] learning with much success. These systems typically use an expectation-maximization learning algorithm for learning the parameters, such as skin color, associated with specific target objects.

Although color distributions are a gross quality of object texture, learning localized textures of target objects is also of interest. Consequently, other work has focused on intricate facial geometry and texture, using an array of algorithms to recover fine detail [4] of the textures of a target object. These textures are then used in subsequent tracking of the target object.

Finally, work has been done in learning the dynamic geometry, i.e. the changing configuration (pose or articulation), of a target. The most elementary of such systems use one of the many variations of the Kalman Filter, which "learns" a target's geometric state [2]. In these cases, the value of the learned model is fleeting since few targets ever maintain constant dynamic geometries. Other related systems focus on models of motion. Such systems include learning of multi-state motion models of targets that exhibit a few discrete patterns of motion [5, 9].

However, the aforementioned systems typically require manual intervention in learning or fine-tuning those tracking systems. Consequently, it is difficult or impossible for such systems to quickly respond to the dynamic environment often associated with tracking possibly moving target objects under possibly changing lighting conditions. Therefore, in contrast to the aforementioned systems, what is needed is a system and process for automatically learning a reliable tracking system during tracking without the need for manual intervention and training of the automatically learned tracking system. Specifically, the system and process according to the present invention resolves the deficiencies of current locating and tracking systems by automatically learning, during tracking, a reliable color-based tracking system automatically tailored to specific target objects under automatically observed conditions.

It is noted that in the preceding paragraphs, the description refers to various individual publications identified by a numeric designator contained within a pair of brackets. For example, such a reference may be identified by reciting, "reference [1]" or simply "[1]". Multiple references are identified by a pair of brackets containing more than one designator, for example, [5, 6, 7]. A listing of the publications corresponding to each designator can be found at the end of the Detailed Description section.

SUMMARY

The present invention involves a new system and process for automatically learning a color-based object model for use in a color-based tracking system. To address the issue of model fidelity with respect to specific target objects, the color-based object model is automatically tailored to represent one or more specific target objects, such as, for example, specific spacecraft, aircraft, missiles, cars, electrical circuit components, people, animals, faces, balls, rocks, plants, or any other object, in a temporal sequence of at least one image. Learning of the color-based object model is accomplished by automatically determining probabilistic relationships between target object state estimates produced by an initial generic tracking system in combination with observations gathered from each image. This learned color-based object model is then employed with a color-based tracking function to produce an improved color-based tracking system which is more accurate than the initial generic tracking system.

In general, the system and method of the present invention automatically generates a reliable color-based tracking system by using an initial object model in combination with an initial tracking function to process a temporal sequence of images, and a data acquisition function for gathering observations about each image. Further, in one embodiment, these observations are associated with a measure of confidence that represents the belief that the observation is valid. Observations gathered by the data acquisition function are relevant to parameters or variables required for the learned color-based object model. For example, observations about the red-green-blue (RGB) color value of pixels at particular points in each image would be relevant to the learned color-based object model. Color observations are not restricted to RGB space—other possibilities include, but are not limited to, normalized RGB, YUV, YIQ, HSV, HSI, or any other conventional color spaces. These relevant observations are used by the learning function in combination with the output of the initial tracking function for automatically learning the color-based object model automatically tailored to a specific target object.

The initial tracking system discussed below uses a contour-based object model in combination with a contour-based tracking function to roughly locate a target object in each image. However, the initial tracking function and associated object model may be any tracking system that returns a configuration estimate for the target object, such as, for example, a motion-based, shape-based, contour-based, or color-based tracking system. In other words, the system and method of the present invention may use the output of any type of initial tracking system to learn a tailored color-based object model for use in a target specific color-based tracking system.

Data output from the initial tracking function, in combination with the observations generated by the data acquisition function, are fed to the learning function. The learning function then processes the data and observations using histograms to model the probability distribution functions (PDF) relevant to the particular color-based object model. Other learning methods may also be employed by the learning function, including, for example, neural networks, Bayesian belief networks (BBN), discrimination functions, decision trees, expectation-maximization on mixtures of Guassians, and estimation through moment computation, etc. Once the color-based object model is learned, the parameters defining this color-based object model are provided to the final color-based tracking function which processes a temporal sequence of one or more images to accurately locate and track one or more target objects in each image.

As mentioned previously, one embodiment of the present invention includes an initial contour-based tracking function for locating and tracking target objects such as human faces. This initial tracking function accepts the parameters defining an initial contour-based object model of an expected target object, such as a generic human face, in combination with one or more sequential images, and outputs a state estimate for each image. Human faces are roughly elliptical. Therefore, when tracking human faces, the initial contour-based tracking function uses adjacent frame differencing to detect moving edges in sequential images, then continues by using contour tracking to track the most salient ellipse or ellipses by comparing the detected edges to elliptical contours in the contour-based object model of a generic face. This conventional technique returns a state estimate over each image, detailing the probable configurations of one or more faces in the image. Such a technique is capable of returning a state estimate after processing a single image. However, accuracy improves with the processing of additional images.

The aforementioned state estimate is a probability distribution over the entire range of configurations that the target object may undergo, wherein higher probabilities denote a greater likelihood of the particular target object configuration. The target configuration typically contains not only position and orientation information about the target object, but also other parameters relevant to the geometrical configuration of the target object such as, for example, geometric descriptions of the articulation or deformation of non-rigid target objects. Multiple targets may be handled by assigning a separate tracking system to each target (where, for example, each tracking system may focus on a single local peak in the probability distribution), or by allowing separate tracking functions to generate a different probability distribution per image, based on distinct characteristics of each of the targets. In the case where multiple target objects are identified, individual color-based object models are learned for each target object by individually processing each target object as described below for the case of a single target object. Alternatively, a single color-based object model representing all identified target objects may be learned, again, as described below for the case of a single target object.

The data acquisition function is specifically designed to collect observations relevant to the parameters required by the color-based tracking function with which the color-based object model will be used. Consequently, the data acquisition function collects observations or data from each image that will be useful in developing the color-based object model representing the color distribution of a specific target object. Thus, in collecting observations, the data acquisition function observes or samples the color values of each image. For example, with respect to tracking a human face, the data acquisition function is designed to return observations such as the skin color distribution of a specific human face.

Typically, the entire image will be used by the data acquisition function in collecting observations. In such an embodiment, pixel color information for the entire image is returned as observations. However, in alternate embodiments, the area over which observations are gathered is limited. Limiting the area over which observations are gathered tends to reduce processing time, and may increase overall system accuracy by providing data of increased relevancy in comparison to collecting observations over the entire image. Thus, in one embodiment, the state estimate generated by the initial tracking function is used by the data acquisition function such that observations will be made regarding only those portions of each image having a predefined minimum threshold probability of target object identification. In other words, the data acquisition function samples specific areas of each image with respect to the state estimate and returns probable surface colors for the target object. In another embodiment, observations from the data acquisition function are collected in only those regions of the target configuration space which are likely to be occupied by the target based on methods such as, for example, dynamic target prediction. In each embodiment, the observations are then provided to the learning function.

When gathering observations for limited portions of each image, as discussed above, the data acquisition function preferably observes or samples the color values of each of a group of image pixels from an area around the predicted centroid of a probable target object. However, many other methods for observing the color of specific pixels within the area of the target face may be used. For example, in an alternate embodiment of the data acquisition function, the color value of a single image pixel at the centroid of probable target objects may be used in collecting observations. While this method produces acceptable results, it tends to be less accurate than the preferred method, as bias can be introduced into the learned color-based model. For example, in tracking faces, the single pixel chosen may represent hair or eye color as opposed to skin color. In another embodiment of the data acquisition function, the color value of one or more image pixels at a random location within a predefined radius around the centroid of probable target objects may be used in collecting observations. While this method also produces acceptable results, it also tends to be less accurate than the preferred method. Finally, in a further embodiment of the data acquisition function, a weighted average of the color values of a group of pixels within the area of the probable target object may also be returned as an observation. Again, while this method also produces acceptable results, it also tends to be less accurate than the preferred method.

As discussed previously, the learning function automatically learns and outputs the color-based object model using a combination of the state estimates generated by the initial contour-based tracking function and the observations generated by the data acquisition function. However, in one embodiment the learning function also employs a partial or complete preliminary color-based object model as a baseline to assist the learning function in better learning a probabilistically optimal object model. The preliminary object model is a tentative color-based model that roughly represents the target object, such as a generic human face or head. One example of a partial object model, with respect to head or face tracking, is the back of the head, which is typically a relatively featureless elliptical shape having a relatively uniform color. The learning function combines this partial model with information learned about the sides and front of the head, based on data input to the learning function from the initial tracking function and the data acquisition function, to generate the learned color-based model. However, while the use of the preliminary object model may allow the learning function to more quickly or more accurately learn a final object model, the use of a preliminary object model is not required.

Before the learning function outputs the color-based object model, both the initial tracking function and the data acquisition function preferably process a predetermined number of images as described above. The number of images that must be processed before the learning function may output the color-based object model is dependent upon the form of the initial tracking function. For example, where the aforementioned contour-based tracking function is used for the initial tracking function, the learning function is capable of outputting the color-based object model after a single image has been processed, although model quality is improved with more data from additional images. Other initial tracking systems may require processing of different numbers of images before the learning function has sufficient data to output a learned color-based object model.

In general, the learning function uses automated methods for identifying variable probabilistic dependencies between the state estimates, observations, and preliminary color-based object model, if used, to discover new structures for a probabilistic model that is more ideal in that it better explains the data input to the learning function. Consequently, the learning function is able to learn the probabilistic model best fitting all available data. This probabilistic model is then used by the learning function to output the color-based object model. The variable probabilistic dependencies identified by the learning function tend to become more accurate as more information, such as the data associated with processing additional images, is provided to the learning function. In one embodiment of the present invention, the learning function uses probability distribution functions represented using histograms to approximate the state of the target object and the observations returned by the data acquisition function.

The learned color-based object model is comprised of parameters or variables identifying color ranges likely to correspond to a specific target face, as well as color ranges likely to correspond to an image background. Further, these color ranges may also be associated with a measure of confidence indicating the likelihood that they actually correspond to either the target object or to the background.

The primary use for the color-based object model is to provide the parameters used by the color-based tracking function to locate and track one or more target objects such as human faces in one or more sequential images. However, the learned color-based object model may also be used in several alternate embodiments to further improve overall tracking system accuracy.

First, the learned color based object model may be iteratively fed back into the learning function to replace the initial preliminary object model. This effectively provides a positive feedback for weighting colors most likely to belong to either target object or background pixels in the image. Similarly, in the embodiment where the aforementioned preliminary object model is not used, the learned color-based object model may also be iteratively provided to the learning function. Essentially, in either case, this iterative feedback process allows the current learned color-based object model to be fed back into the learning function as soon as it is learned. The learning function then continues to learn and output a color-based model which evolves over time as more information is provided to the learning function. Consequently, over time, iterative feedback of the current learned color-based model into the learning function serves to allow the learning function to learn an increasingly accurate color-based model.

Second, in a further embodiment, the color-based object model may be used to iteratively replace the initial contour-based object model, while the color-based tracking function is used to replace the initial contour-based tracking function. In this manner, both the accuracy of the state estimate generated by the initial tracking function and the accuracy of the learning function are improved. Consequently, the more accurate state estimate, in combination with the improved accuracy of the learning function, again allows the learning function to learn an increasingly accurate color-based object model.

Third, in another embodiment, the two embodiments described above may be combined to iteratively replace both the initial contour-based object model and the generic prior object model with the learned color-based object model, while also replacing the initial contour-based tracking function with the color-based tracking function. In this manner, both the accuracy of the state estimate generated by the initial tracking function and the accuracy of the learning function are improved. Consequently, the more accurate state estimate, in combination with the improved accuracy of the learning function, again allows the learning function to learn an increasingly accurate final object model.

In tracking target faces, the color-based tracking function accepts the parameters defining the learned color-based object model, in combination with one or more sequential images and outputs either a state estimate for each image, or simply target object position information with respect to each image. As with the state estimate output by the initial tracking function, the state estimate output by the color-based tracking function is a probability distribution over the entire range of the image wherein higher probabilities denote a greater likelihood of target object configuration. The color-based object model contains the information about which color ranges are specific to target objects such as faces, and which color ranges are specific to the background. Consequently, the color-based tracking function can simply examine every pixel in the image and assign it a probability, based on the measure of confidence associated with each color range, that it either belongs to the target object or to the background. Further, as discussed above, the color-based object model may be iteratively updated, thereby increasing in accuracy over time. Consequently, the accuracy of the state estimate or position information output by the color-based tracking function also increases over time as the accuracy of the color-based object model increases.

In a further embodiment of the present invention, the process described above for learning the color-based object model may be generalized to include learning of any number of subsequent or "final" object models. For example, the learned color-based object model and final tracking function described above may be used as an initial starting point in combination with a subsequent data acquisition function and a subsequent learning function to learn a subsequent object model. Clearly, this process may be repeated for as many levels as desired to generate a sequence of increasingly accurate tracking systems based on increasingly accurate learned object models.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
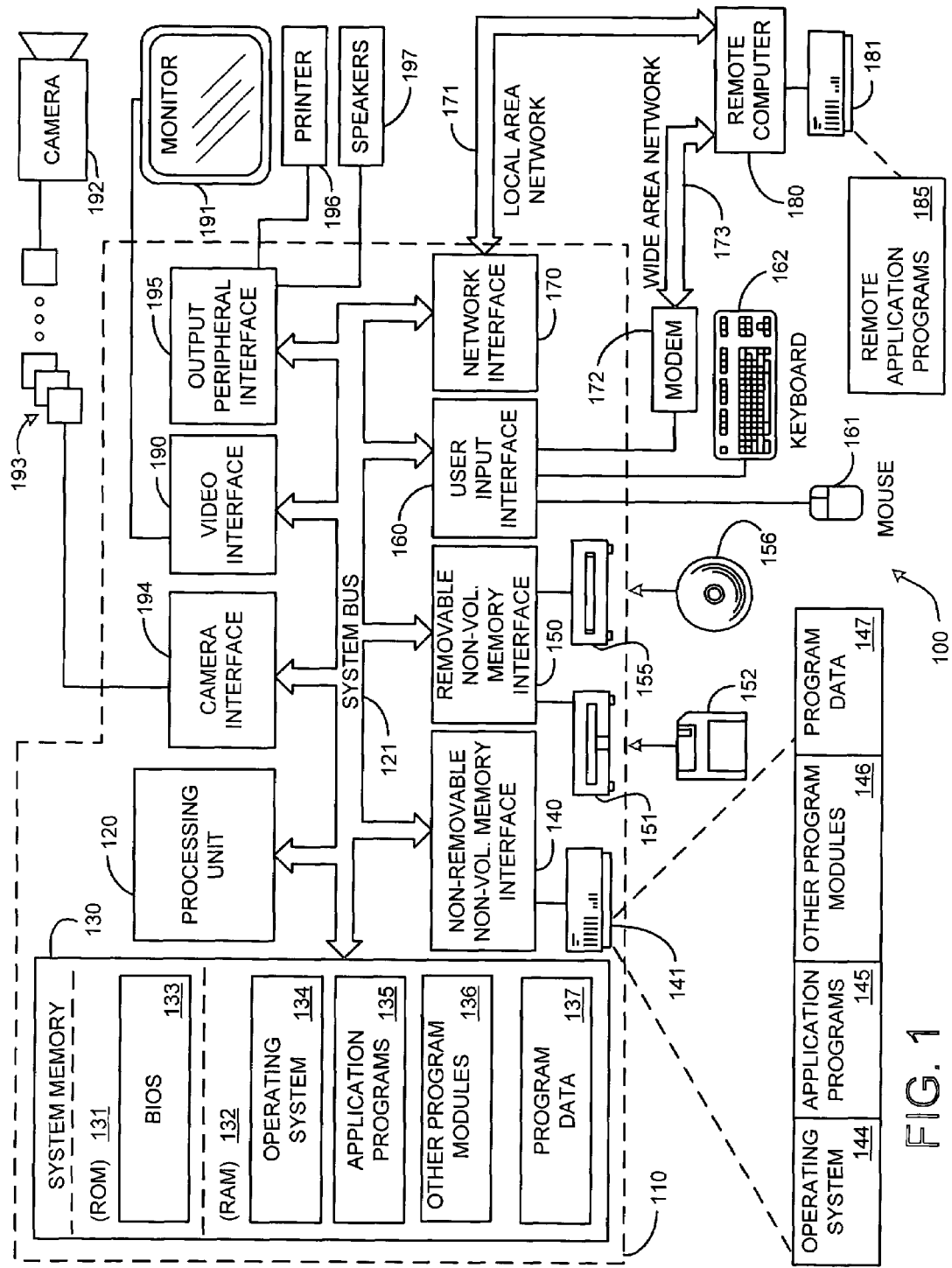
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and process embodying the present invention. The program modules associated with automatically learning and generating a reliable color-based tracking system will be described first in reference to the system diagram of FIG. 2. Then, the processes for automatically learning and generating a reliable color-based tracking system will be described with reference to the flow diagram of FIG. 3.

Figure 2:
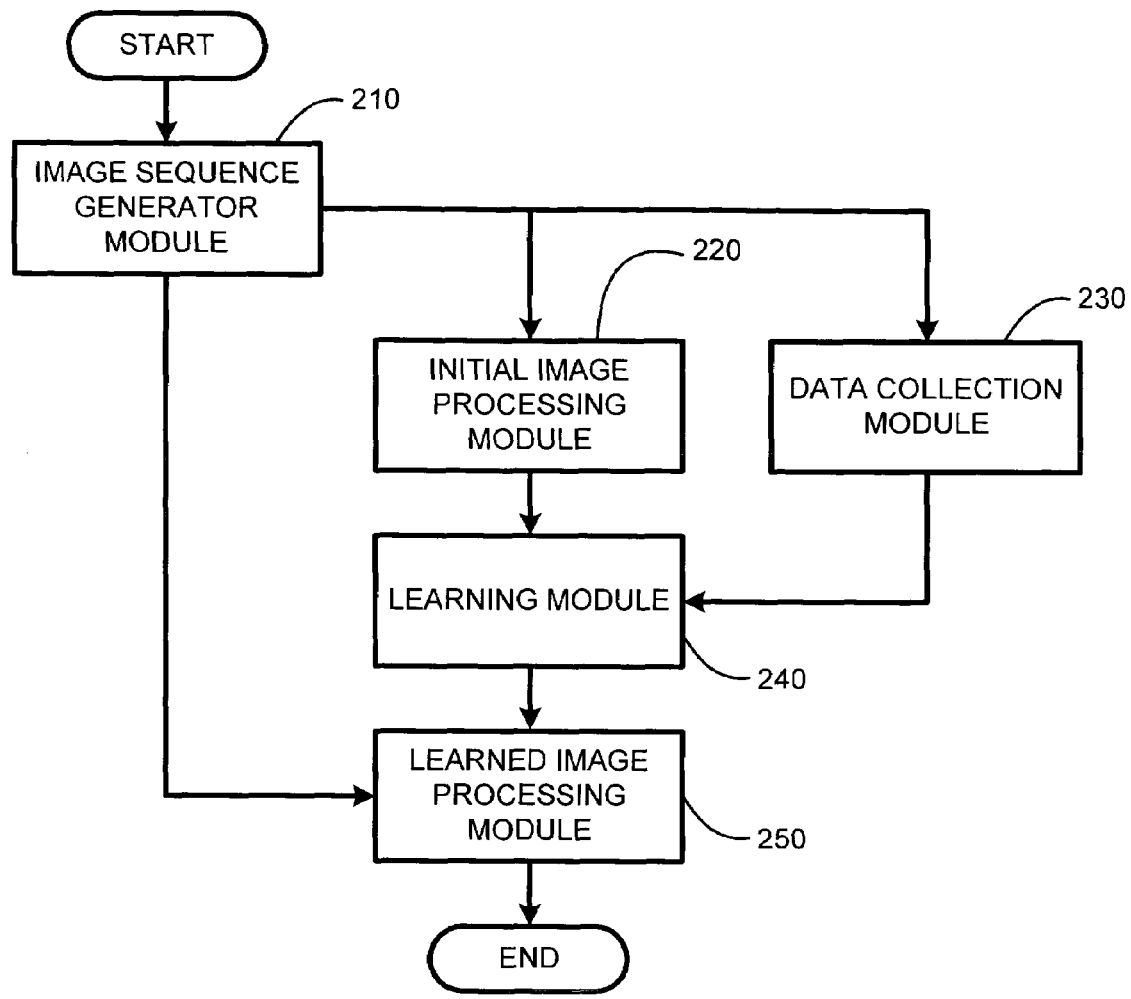
FIG. 2 is a system diagram depicting program modules employed for learning a reliable color-based tracking system in accordance with the present invention.

System Overview:

FIG. 2 is a general system diagram illustrating program modules used for learning a tracking system in accordance with the present system and process. In general, the system and process according to the present invention uses the program modules illustrated in FIG. 2 to automatically learn new color-based object models tailored to one or more specific target objects, such as, for example, specific spacecraft, aircraft, missiles, cars, electrical circuit components, people, animals, faces, balls, rocks, plants, or any other object, during tracking operations. These tailored object models are then used in combination with a color-based tracking function to locate and track objects through one or more sequential images.

Specifically, as illustrated in FIG. 2, the process is started by using a sequential image generator module 210 to automatically provide one or more sequential images of a scene within which tracking is desired to an initial image-processing module 220 and a data collection module 230. These sequential images may be either two dimensional or three-dimensional images, and are preferably captured using conventional methods, such as, for example one or more still or video cameras. The sequential image generator module 210 preferably provides these sequential images as a live input via a conventional image capture device connected to a computing device for implementing the present invention. However, the sequential image generator module 210 may also provide sequential images that have been previously recorded and stored on computer readable media using conventional methods. These stored sequential images may then be processed at any convenient time in the same manner for as live images. Further, because the sequential image generator module 210 provides images on an ongoing basis, for as long as tracking is desired, the program modules described herein continue to generate updated outputs, as described below, for as long as additional images are processed.

Whether the images are live, or stored on computer readable media, the initial image-processing module 220 processes each sequential image and returns a state estimate over each image. This state estimate represents a probabilistic distribution of target object configurations within each image. The data collection module 230 processes the same images as the initial image-processing module 220, and returns observations regarding each image that are used by a learning module 240 in learning a color-based object model for use in a learned image-processing module 250.

The learning module 240 then processes the state estimates and observations using probability distribution functions (PDF) modeled using histograms to learn the final color-based object model. Other learning methods may also be employed by the learning module 240, including, for example, neural networks, Bayesian belief networks (BBN), discrimination functions, decision trees, expectation-maximization on mixtures of Guassians, probability distribution functions (PDF), and estimation through moment computation, etc.

The learning module 240 essentially determines the probabilistic relationships between the observations returned by the data collection module 230 and the state estimates returned by the initial image-processing module 220. Next, the learning module 240 employs these probabilistic relationships to automatically learn the color-based object model for use with a final color-based tracking system in the learned image-processing module 250. The learned image-processing module 250 is then used to process one or more sequential images to return a state estimate over each image. Again, the state estimate represents probabilistic target object configurations within each image.

Initial Image-processing:

The initial image-processing module 220 preferably uses a conventional contour-based tracking system to probabilistically locate or track one or more target objects in an image or scene. However, the initial image-processing module 220 may use one of any number of conventional tracking systems. Such tracking systems are typically comprised of a generic object model, having parameters that roughly represent an object for which tracking is desired, in combination with a tracking function. By way of example, and not limitation, such tracking functions may include contour-based, color-based, edge-based, shape-based, and motion-based tracking functions. In general, these object tracking systems use the generic object model in combination with the tracking function, to probabilistically determine the configuration of at least one target object in one or more sequential images.

The target object configuration typically represents not only the position of the target object, but the orientation and other parameters relevant to the geometrical configuration of the target object such as, for example, geometric descriptions of the articulation or deformation of non-rigid target objects. For example, a tracking function using face position and orientation information may collect data about eye color which might in turn be used to determine face position and orientation. The image pixels that would be examined for data acquisition will depend not only on the (x, y) or (x, y, z) position of the center of the face in a two-dimensional or three-dimensional image, respectively, but also upon the orientation of the face, since a tilt or shake of the head will change where the eyes are in the image, even with no change in the (x, y), or (x, y, z) coordinates of face position, per se. Thus, in this example, the data acquisition function would collect data over the entire range of possible target configurations, that is, for (x, y, rx, ry, rz), or (x, y, z, rx, ry, rz) where rx, ry, and rz represent orientation information representing rotation of the head in the x, y, and z-axes. In another example, a tracking function using body position and orientation information may collect data about the hand color of the body which in turn might be used to determine hand position and orientation. In this example, in addition to the position and orientation of the torso, other relevant configuration information would also include the angular parameters associated with the shoulders, elbows, and wrists, to fully specify the location of the hands. Once the location of the hands has been determined, image pixels representing hand color may be sampled. However, it is also possible for the space of target configurations to be the same as the range of target positions in the image, depending upon the specific target object, and the parameters of the tracking function. In other words, orientation information is not always required.

Specifically, the initial image-processing module 220 preferably includes an initial contour-based tracking function for locating and tracking target objects such as human faces. This contour-based tracking function accepts the parameters defining a contour-based object model of an expected target object, in combination with one or more sequential images provided by the sequential image generator module 210. For example, human faces are roughly elliptical. Consequently, in detecting human faces, the initial contour-based tracking function uses adjacent frame differencing to detect moving edges in sequential images, then continues by using contour tracking to track the most salient ellipse or ellipses by comparing the detected edges to elliptical contours in the contour-based object model of a generic face. This conventional technique returns a state estimate over each image, detailing the probable configurations of one or more faces in the image.

The state estimate is a probability distribution over the range of configurations of the target object wherein higher probabilities denote a greater likelihood of target object configuration. Multiple targets may be handled by assigning a separate tracking system to each target (where, for example, each tracking may focus on a single local peak in the probability distribution), or by allowing separate tracking functions to generate a different probability distribution per image, based on distinct characteristics of each of the targets. In the case where multiple target objects are probabilistically identified by the initial image-processing module 220, individual object models are learned for each target object by individually processing each target object as described herein for the case of a single target object. Alternatively, a single model representing all identified target objects may be learned, again, as described herein for the case of a single target object. The state estimate output by the initial image-processing module 220 is provided to the learning module 240 for use in learning an object model tailored to one or more specific target objects as described in detail below. In addition, this state estimate may also be provided to the data collection module 230 for use in refining the image observations gathered by the data collection module.

Data Collection:

The data collection module 230 includes a data acquisition function that gathers observations or data about each of the images processed by the initial image-processing module 220. These observations are relevant to parameters desired for the learned object model, and may include information such as, for example, the color, shape, or size of a tracked object. The specific information returned as observations depend on the parameters necessary to support a known final tracking function. In other words, the data collection module 230 is specifically designed to collect observations relevant to the parameters required by the tracking function with which the learned object model will be used. Further, in one embodiment, these observations are associated with a measure of confidence that represents the belief that the observation is valid. Further, this measure of confidence may be used to weight the observations.

Typically, the data collection module 230 collects data for the entire space of possible target configurations. Thus, because the final tracking function uses a color-based tracking method, the data collection module 230 is designed to return observations of pixel color throughout the entirety of each image. However, in alternate embodiments, the area over which observations are gathered is limited. Limiting the area over which observations are gathered tends to reduce processing time, and may increase overall system accuracy by providing data of increased relevancy in comparison to collecting observations over the entire image. For example, where data is gathered in only those areas where there is a higher probability of target object configuration, the color observations are more likely to be taken from the actual target object.

Consequently, in one embodiment, the data collection module 230 uses the state estimate generated by the initial image-processing module 220 such that observations are made regarding only those portions of each image having a predefined minimum threshold probability indicating the probable location of a target object. In a further embodiment, the data collection module 230 can restrict data collection to only those regions of the target configuration space which are likely to contain the target based on, for example, dynamic prediction of target object configuration. Other methods for limiting the range over which the data collection module 230 operates are also feasible. These methods include, but are not limited to, use of prior probabilities on expected configurations (which will restrict data collection to only those configurations which are deemed more likely to occur in practice), restrictions placed by other sensing modalities (for example, in the case of person/face tracking, audio information generated by a microphone array may be used to restrict the likely places where a person can be), constraints placed by other tracked objects in the scene (if one target occupies a particular configuration, it eliminates the possibility that other targets are in the immediate vicinity of the configuration space), etc. Regardless of which embodiment is implemented, the observations are then provided to the learning module 240.

For example, because the initial image-processing module 220 preferably tracks target objects using a contour-based tracking function, and the final tracking function tracks target objects based on detection of target object color, the data collection module 230 is designed to return observations of red-green-blue (RGB) color information in particular regions of target objects located by the initial image-processing module 220. However, color observations are not restricted to RGB space—other possibilities include, but are not limited to, normalized RGB, YUV, YIQ, HSV, HSI, or any other conventional color spaces. In other words, the data collection module 230 preferably samples specific areas of each image with respect to the state estimate and returns probable surface colors for the target object. For example, a preferred method for collecting observations is for the data collection module 230 to observe or sample the color values of each of a group of image pixels from an area around the centroid of a probable target object.

Many other methods for observing the color of specific pixels within the area of the target object may be used. For example, in an alternate embodiment of the data collection module 230, the color value of a single image pixel at the centroid of a probable target object is used in collecting observations. While this method produces acceptable results, it tends to be less accurate than the preferred method, as bias can be introduced into the learned color-based object model. For example, in tracking human faces, the single pixel chosen might represent hair or eye color as opposed to skin color. Because hair or eye color typically represent small fractions of the total surface area of a human face, the learned color based model will tend to be less accurate than where the pixel chosen actually represents skin color.

In another embodiment of the data collection module 230, the color value of one or more image pixels at a random location within a predefined radius around the centroid of probable target objects may be used in collecting observations. While this method also produces acceptable results, it also tends to be less accurate than the preferred method. Finally, in a further embodiment of the data acquisition function, a weighted average of the color values of a group of pixels within the area of the probable target object may also be returned as an observation. Again, while this method also produces acceptable results, it also tends to be less accurate than the preferred method.

Learning:

The learning module 240 preferably uses PDF estimation using histograms to learn and output a color-based object model. However, any of the aforementioned learning methods may be employed by the learning module 240 to learn and output the color-based object model. In general, the learning module 240 learns the color-based object model by determining probabilistic relationships between the state estimates generated by the initial image-processing module 220 and the observations generated by the data collection module 230. The color-based object model learned by the learning module 240 is comprised of the parameters required by the color-based tracking function used in the learned image-processing module 250.

Further, the learning module 240 may also employ a preliminary object model as a probabilistic baseline to assist in learning the color-based object model. This preliminary object model is a tentative object model comprised of generic parameters that roughly represent an expected target object. The preliminary object model may be a complete or a partial model, or may initially be blank. One example of a partial object model, with respect to head or face tracking, is the back of the head, which is typically a relatively featureless elliptical shape having a relatively uniform color. The learning module 240 combines this partial model with information learned about the sides and front of the head, based on data input to the learning module from the initial image-processing module 220 and the data collection module 230, to automatically generate the learned color-based object model.

Before the learning module 240 learns and outputs the color-based object model, both the initial image-processing module 220 and the data collection module 230 preferably process a predetermined number of images as described above. The number of images that must be processed before the learning module 240 may output the color-based object model is dependent upon the form of the initial tracking function. For example, where the aforementioned contour-based tracking function is used for the initial tracking function, the learning module 240 is capable of learning and outputting the color-based object model after a single image has been processed, although model quality is improved with more data from additional images. Using other initial tracking functions, as described above, may require processing of different numbers of images before the learning module 240 has sufficient data to output a learned color-based object model. For example, where a motion-based tracking function is used in the initial image-processing module 220, at least two sequential images will likely need to be processed by the initial image-processing module and the data collection module 230 before the learning module 240 can output a learned object model. However, where the tracking function used in the initial image-processing module 220 uses color or edge-based detection techniques, the learning module 240 can output a learned object model after a single image has been processed.

As stated previously, the learning module 240 includes a learning function. This learning function uses automated methods to identify variable probabilistic dependencies between the state estimates, observations, and preliminary object model, if used, to discover new structures for a probabilistic model that is more ideal in that it better explains the data input to the learning function. Consequently, the learning module 240 "learns" the probabilistic model best fitting all available data. The learning module 240 then uses this probabilistic model to output the learned color-based object model. The variable probabilistic dependencies identified by the learning function, and thus the learned color-based object model, both tend to become more accurate as more information is provided to the learning function. Consequently, the learned color-based object model may be considered to be dynamic, as the learning module 240 can continue to learn and update the learned color-based object model over time as more images are processed.

In learning the final model, the conditional probability of an observed variable, U, is determined with respect to a body of data, $D_n = (D_1, \ldots D_n)$, and the preliminary object model, $\phi$, if used. $D_n$ represents the body of data that includes the target object configuration information generated by the initial image-processing module 220 and the observations collected by the data acquisition module 230. Thus, the conditional probability of U is represented by $p(U|D_n,\phi)$. This conditional probability, $p(U|D_n,\phi)$, can be determined if $p(\theta|D_n,\phi)$ is known, where $\theta$ represents the learned model. Consequently, the final model can be computed by Bayes' Rule:

$$p(\theta \mid D, \phi) = \frac{p(\theta, \phi) p(D \mid \theta, \phi)}{p(D \mid \phi)} \qquad \text{Equation 1}$$

where the marginal likelihood, $p(D|\phi)$, is given by:

$$p(D|\phi) = \int p(D|\theta,\phi) p(\theta|\phi) d\theta \qquad \text{Equation 2}$$

$p(U|D,\phi)$ is then computed by marginalizing over $\theta$ as follows $$p(U|D,\phi) = \int p(U|\theta,\phi) p(\theta|D,\phi) d\theta \qquad \text{Equation 3}$$

In general, neither the posterior in Equation 1, nor the integral in Equation 3 are easy to compute, since the expressions for $p(D|\theta,\phi)$ and $p(\theta|\phi)$ can be arbitrarily complex. Fortunately, there are approximations to simplify the analysis. Consequently, U is discretized, and it is assumed that the distributions can be captured by conjugate distributions which provide tractable analytical solutions under certain assumptions about the models.

Thus, the observed variable, U, is discretized such that it can assume any of r possible values, $u_1, \ldots, u_r$. Further, it is assumed that the final model parameters are given by $\theta = \{\theta_1, \ldots, \theta_r\}$, with $\theta_k \geq 0$, and $\Sigma^r_{k=1} \theta_k = 1$, and that the likelihood function for U is given by $$p(U=u_k|\theta,\phi) = \theta_k \qquad \text{Equation 4}$$

for $k=1, \ldots, r$. Consequently, any PDF may be represented to arbitrary precision by varying r.

If the data, $D_n$ can be reduced to n independent observations of U, the process of observation is a multinomial sampling, where a sufficient statistic is the number of occurrences of each $\theta_k$ in $D_n$. Consequently, one observation per frame is chosen as follows: For each $D_t$, the pixel at $Z_{x'}$ is chosen, where Z maps target states to observations, and $x' = \arg\max_x p^0(x)$, where x represents the target object configuration. Next, $N_k$ is set equal to the total number of occurrences of $\theta_k$ in the data ($N = \Sigma^r_{k=1} N_k$), then $$p(D_n \mid \theta, \phi) = \prod_{k=1}^{r} \theta_k^{N_k} \qquad \text{Equation 5}$$

What then remains is a determination of the form of the prior, $p(\theta|\phi)$, Dirichlet distributions, which when used as a prior for this example, have several convenient properties. Among them are the fact that (1) a Dirichlet prior ensures a Dirichlet posterior distribution, and (2) there is a simple form for estimating $p(U|D,\phi)$. The Dirichlet distribution is as follows:

$$p(\theta \mid \phi) = Dir(\theta \mid \alpha_1, \ldots, \alpha_r) \qquad \text{Equation 6}$$

$$\equiv \frac{\Gamma(\alpha)}{\prod_{k=1}^{r} \Gamma(\alpha_k)} \prod_{k=1}^{r} \theta_k^{\alpha_k - 1}, \qquad \text{Equation 7}$$

where $\alpha_k$ is a "hyperparameter" for the prior, with $\alpha_k > 0$, $\alpha = \Sigma^r_{k=1} \alpha_k$, and $\Gamma(\cdot)$ is the Gamma function.

Properly, a Dirichlet distribution is a unimodal distribution on an (r−1)-dimensional simplex. When used to represent a distribution of a single variable with r bins, it can be interpreted as a distribution of distributions. In the present case, it is used to model the distribution of possible distributions of U, where $p(U=u_k|D,\phi)$ is the expected probability of $u_k$ integrated over $\theta$ (Equation 9).

As distributions of distributions, Dirichlet distributions contain more information than a single PDF alone. For example, a Beta distribution of $\alpha_1 = \alpha_2$ for a PDF also provides information about the confidence in that PDF. Specifically, as $\alpha=\alpha_1+\alpha_2$ increases, the confidence in the expected PDF increases as well.

Consequently, with the aforementioned prior, the posterior becomes $$p(\theta|D,\phi)=\text{Dir}(\theta|\alpha_1+N_1,\ldots,\alpha_r+N_r), \quad \text{Equation 8}$$

and the probability distribution for $U_{n+1}$ is $$p(U_{n+1}=u_k|D,\phi)=\int \theta_k p(\theta|D,\phi)d\theta = \frac{\alpha_k+N_k}{\alpha+N} \quad \text{Equation 9}$$

The consequence of the discretization of $\theta$ and the assumption of the Dirichlet prior is the simple form of Equation 9. Effectively, it is only necessary to count the number of samples in the data for each bin of the histogram. Further, if $\alpha_k=1$ for all k (a flat, low-information prior, which is used in the following example), then the probability of observing $u_k$ is $(N_k+1)/(N+r)$, which asymptotically approaches the fraction that $u_k$ is observed in the data. In addition, as the number of observations increases, the effect of the prior diminishes; in the limit, the influence of the prior vanishes. Consequently, this is a particularly intuitive form for expressing prior probabilistic beliefs. The relative sense for how often each of the $u_k$ occurs is decided by the relative values of $\alpha_k$, and the confidence in the belief in the prior is determined by their sum, $\alpha$.

For example, in accordance with the preceding discussion, the learning function receives the color value observations of the target object returned by the data collection module 230. These color value observations are represented by the variable U which is discretized such that it can assume any of r possible values, $u_1, \ldots, u_r$. A normalized histogram, having r bins, representing a probability distribution function (PDF) of the observed variable U is then generated by the learning function. This target object PDF may be represented to an arbitrary level of precision by varying r. Thus, increasing the value of r, serves to increase the granularity of the histogram. Consequently, increasing the value of r improves the accuracy of the histogram in representing the color range of the image. In a tested embodiment using an RGB color space, a target object PDF having $32^3$ bins (32,768 bins) was found to adequately represent the range of colors in a sequence of images, where each of the RGB color channels was quantized into 32 discrete values.

The received color values are dumped into their corresponding histogram bins, effectively providing a running tally of the number of times a particular color value is observed during data acquisition. Further, in one embodiment, each tally is weighted by a number that is proportional to its confidence measure, which may be provided by the data collection module 230, as described above.

Further, the histogram representing the target object PDF may be represented using a Dirichlet distribution that, in effect, keeps a current count for each bin of the histogram while also providing a measure of confidence in the target object PDF.

The target object PDF is statistically nonparametric in the sense that, although the histogram is modeled by a finite number of parameters equal to the number of histogram bins, these bins may be considered to be discrete approximations to elements of a nonparametric function space. In other words, the histogram bins of the target object PDF each represent discrete approximations of color over the nonparametric range of colors in the image.

Similarly, in one embodiment, the learning function also computes a "background" PDF of the color values for each pixel in the entire image. The background PDF histogram is also represented using a Dirichlet distribution as described above. In the simplest case, the background PDF is flat, indicating that all colors are equally likely to occur in the background. Ideally, one or more "snapshots" or images of an area are taken at a point in time when there are no target objects in the area. This "clean" background image is then used for generating the background PDF. Alternately, the background PDF may be computed by observing the color values of those pixels in areas of the image not having a state estimate, as described above, indicating a probable target object. Further, the background PDF may be computed from the entire image, even if it contains target objects. However, while use of an image containing target objects to produce the background PDF may produce acceptable results, discriminability between target object image pixels and non-target object image pixels is decreased, thereby reducing overall tracking system performance. In the absence of an explicit background model, one can use a flat, normalized histogram in which every color value is equally likely.

Further, as discussed above, the preliminary object model may also be used by the learning function as a baseline to assist in learning the color-based object model. Because both the target object PDF and background PDF color ranges are represented by histograms, the preliminary object model is also provided as a PDF represented by a histogram. The preliminary object model PDF is used to bias or weight either or both the background PDF histogram and the target object PDF histogram. In other words, the value in each bin of the preliminary object PDF histogram is added to the corresponding bin in either or both the background PDF histogram, and the target object PDF histogram. The effect of this bias is that colors believed to most likely represent either the target object, or the background, are given a larger weight. For example, in tracking human faces, colors such as blue and green do not likely correspond to skin color, while colors such as pink and tan likely do correspond to skin color. Consequently, in tracking human faces, a preliminary object PDF histogram can be designed that provides additional weight for blue and green in the background PDF, and/or additional weight for pink and tan in the target object PDF. The preliminary object PDF histogram is also represented using a Dirichlet distribution as described above.

Next, the learning function weights or scales the target object PDF histogram and the background PDF histogram in accordance with each of their expected areas in the image. This corresponds to the application of a Bayesian decision criterion to determine whether a given pixel is more likely to be part of the modeled target or part of the background. For example, where the background represents 90 percent of the total image area, and the target object or face represents 10 percent of the total image area, the background PDF is multiplied by 0.9, while the target object PDF is multiplied by 0.1. The learning function then performs a bin-by-bin comparison between the weighted background PDF histogram and the weighted target object PDF histogram. Those bins in the target object PDF histogram having scaled values greater than the corresponding bins in the background PDF histogram are considered to represent target object color. Conversely, those bins in the background PDF histogram having scaled values greater than the corresponding bins in the target object PDF histogram are considered to represent background color. Further, a measure of confidence as to whether particular color ranges belong to either the target object or to the background may be associated with each of the color ranges by computing the magnitude of the difference between the compared bins. The learning function then uses this information to output the learned color-based object model.

Learned Image-Processing:

In general, the learned image-processing module 250 accepts the parameters defining the learned object model, in combination with one or more sequential images from the sequential image generator module 210. The learned image-processing module 250 may either reprocess the same temporal sequence of images originally processed by the initial image processing module 220, or alternately, may process sequential images subsequent to those processed by the initial image processing module. In either case, the learned image-processing module 250 outputs either a final state estimate for each image, or simply target object position information with respect to each image.

As with the state estimate output by the initial image-processing module 220, the final state estimate is a probability distribution over the entire range of target configurations wherein higher probabilities denote a greater likelihood of target object configuration. Again, multiple targets may be handled by assigning a separate tracking system to each target (where, for example, each tracking may focus on a single local peak in the probability distribution), or by allowing separate tracking functions to generate a different probability distribution per image, based on distinct characteristics of each of the targets. As discussed above, the learned object model increases in accuracy as the learning module 240 better learns the conditional probabilistic relationships between the data elements provided to the learning module. Consequently, the accuracy of the state estimate or probabilistic configuration information output by the learned image-processing module 250 can increase over time as the accuracy of the learned object model increases.

The learned image-processing module 250 preferably uses a color-based tracking function in combination with the learned color-based object model to probabilistically locate or track one or more target objects in an image or scene. As with the initial image-processing module 220, the learned image-processing module 250 includes an object model and a tracking function. However, one primary difference between the initial image-processing module 220 and the learned image-processing module 250 is that while the initial image-processing module uses a generic object model, the learned image-processing module uses the learned color-based object model automatically generated by the learning module 240. Consequently, the learned image-processing module 250 is inherently more accurate than the initial image-processing module 220.

Specifically, the color-based tracking function accepts the parameters defining the learned color-based object model, in combination with one or more sequential images and outputs either a state estimate for each image, or simply target object position information with respect to each image. As described above, the color-based object model contains the information about which color ranges are specific to target objects, and which color ranges are specific to the background. Consequently, the color-based tracking function can simply examine every pixel in the image and assign it a probability, based on the measure of confidence associated with each color range, that it either belongs to a target object or to the background. These probabilities are then used to output either the state estimate for each image, or target position information for each image.

Operation:

The above-described program modules are employed to learn to reliably track target objects in one or more sequential images by automatically learning a color-based object model for a color-based tracking system using the exemplary process that will now be described. This process is depicted in the flow diagram of FIG. 3 as a series of actions that illustrates an exemplary method for implementing the present invention.

The process is started by providing a temporal sequence of at least one image 310 to the initial tracking function 322. The initial tracking function 322 operates in combination with the initial object model 324, as described above, to probabilistically locate one or more target objects within each image by generating a target state estimate 326. The same sequence of images 310 is also provided to the data acquisition function 332. The data acquisition function 332 then generates color observations for each image that are relevant to the parameters used in learning the learned color-based object model 352. The target state estimate 326, and the image observations 334 are then provided to the learning function 340.

Next, the learning function 340 uses any of the aforementioned learning methods to learn probabilistic dependencies between the target state estimate 326 and the image observations 334. Further, in one embodiment, the preliminary object model 342 is also provided to the learning function 340 to allow the learning function to better learn the probabilistic data dependencies between the target state estimate 326 and the image observations 334 as described above. The learning function 340 then uses these probabilistic data dependencies to automatically learn the color-based object model 352. This learned color-based object model 352 is then provided to the final tracking function 354 for use in tracking target objects.

Finally, once the learning function 340 has provided the learned object model 352 to the final tracking function 354, the final tracking function begins to process sequential images 310 to provide a target state estimate 356 for each sequential image. As previously discussed, this sequence of images 310 may be either the same images as those already processed by the initial tracking function 322, or they may be subsequent to the images previously processed by the initial tracking function. This final tracking process is continued for as long as it is desired to locate and track targets in images.

Additional Embodiments

Figure 3:
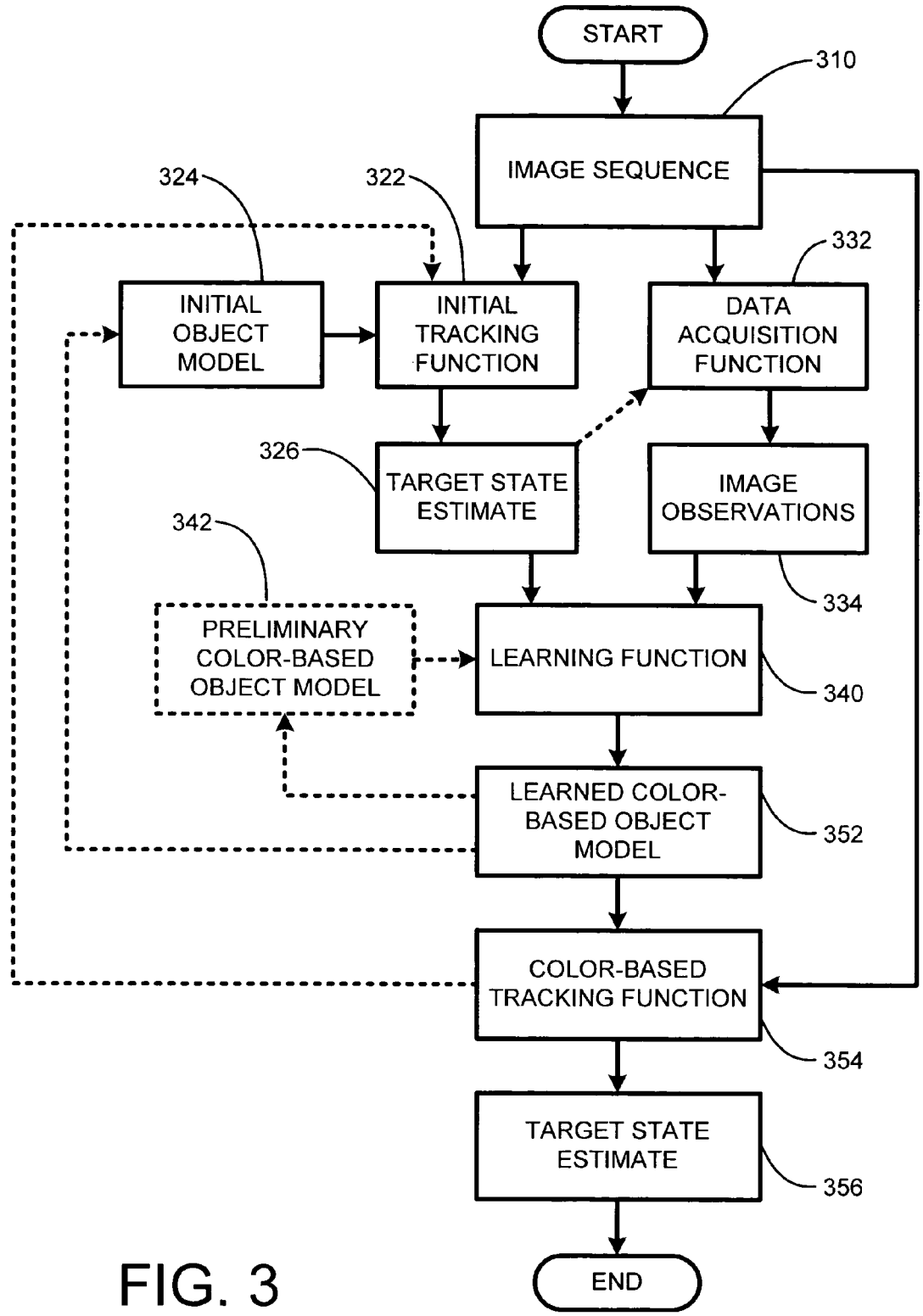
FIG. 3 is a flow diagram illustrating an exemplary process for learning a reliable color-based tracking system according to the present invention.

As described above, the learned color-based object model 352 is comprised of the parameters required by the final tracking function 354. Consequently, the primary use for the learned object model 352 is to provide parameters to the final tracking function 354 for use in processing one or more sequential images. However, the learned object model 352 may also be used in several additional embodiments to improve overall tracking system accuracy. These additional embodiments are illustrated in FIG. 3 using dashed lines.

Specifically, in one embodiment, the learned color-based object model 352 is iteratively fed back into the learning function 340 in place of the preliminary object model 342 to provide a positive feedback for weighting colors most likely to belong to either target object or background pixels in each image. Similarly, in the embodiment where the preliminary object model 342 is not used, the learned color-based object model 352 is also iteratively provided to the learning function 340. Essentially, in either case, this iterative feedback process allows the current learned color-based object model 352 to be fed back into the learning function 340 as soon as it is learned. The learning function 340 then continues to learn and output a color-based model which evolves over time as more information is provided to the learning function. Consequently, over time, iterative feedback of the current learned color-based model 352 into the learning function 340 serves to allow the learning function to learn an increasingly accurate color-based object model. This improvement in accuracy is achieved because the learning function 340 is effectively provided with a better probabilistic baseline from which to begin learning the color-based object model 352. This increasingly accurate learned color-based object model 352 in turn allows the final tracking function 354 to generate increasingly accurate target state estimates 356.

In a further embodiment, the learned color-based object model 352 is used to iteratively replace the initial contour-based object model 324, while the final color-based tracking function 354 is used to replace the initial contour-based tracking function 322. In this manner, the accuracy of the target state estimate 326 generated by the initial tracking function 322 and thus the accuracy of the learning function 340 are improved. Consequently, the more accurate target state estimate 326, in combination with the more accurate learning function 340, again allows the learning function to learn an increasingly accurate learned object model 352. Again this increasingly accurate learned object model 352 in turn allows the final tracking function 354 to generate increasingly accurate target state estimates 356.

In another embodiment, the two embodiments described above may be combined to iteratively replace both the initial contour-based object model 324 and the generic preliminary object model 342 with the learned color-based object model 352, while also replacing the initial contour-based tracking function 322 with the color-based tracking function 354. In this manner, both the accuracy of the state estimate 326 generated by the initial contour-based tracking function 322 and the accuracy of the learning function 340 are improved. Consequently, the more accurate state estimate 326, in combination with the improved accuracy of the learning function 340, again allows the learning function to learn an increasingly accurate color-based object model 352. Again this increasingly accurate learned color-based object model 352 in turn allows the final tracking function 354 to generate increasingly accurate target state estimates 356.

In a further embodiment of the present invention, the process described above for learning the final color-based object model 352 may be generalized to include learning of any number of subsequent learned object models 352. For example, the learned color-based object model 352 and final color-based tracking function 354 described above may be used as an initial starting point in combination with a subsequent data acquisition function and a subsequent learning function to learn a subsequent object model for use with a subsequent tracking function which may be either identical to or distinct from the final color-based tracking function 354. Clearly, this process may be repeated for as many levels as desired to generate a sequence of increasingly accurate tracking systems based on increasingly accurate learned object models.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1]. A. Azarbayejani and A. Pentland. Recursive estimation of motion, structure, and focal length. *IEEE Trans. Patt. Anal. and Mach. Intel.*, 17(6), June 1995.

[2]. S. Birchfield. Elliptical head tracking using intensity gradients and color histograms. In *Proc. Computer Vision and Patt. Recog.*, pages 232-237, 1998.

[3]. A. Chiuso and S. Soatto. 3-D motion and structure causally integrated over time: Theory (stability) and practice (occlusions). *Technical Report* 99-003, *ESSRL*, 1999.

[4]. P. Fua and C. Miccio. From regular images to animated heads: a least squares approach. In *Proc. European Conf. on Computer Vision*, pages 188-202, 1998.

[5]. M. Isard and A. Blake. ICondensation: Unifying low-level and high-level tracking in a stochastic framework. In *Proc. European Conf. on Computer Vision*, pages I:893-908, 1998.

[6]. T. S. Jebara and A. Pentland. Parametrized structure from motion for 3D adaptive feedback tracking of faces. In *Proc. Computer Vision and Patt. Recog.*, 1997.

[7]. N. Oliver, A. Pentland, and F. Berard. LAFTER: Lips and face real time tracker. In *Proc. Computer Vision and Patt. Recog.*, 1997.

[8]. Y. Raja, S. J. McKenna, and S. Gong. Tracking and segmenting people in varying lighting conditions using colour. In *Proc. Int'l Conf. on Autom. Face and Gesture Recog.*, pages 228-233, 1998.

[9]. D. Reynard, A. Wildenberg, A. Blake, and J. Marchant. Learning dynamics of complex motions from image sequences. In *Proc. European Conf. on Computer Vision*, pages 357-368, 1996.

What is claimed is:

1. A method in a computer system for tracking at least one object in at least one sequential image, comprising using a computer to perform the following steps:
   (a) a step for generating a state estimate defining probabilistic configurations of each object for each sequential image by automatically generating a first probability distribution function modeled using a first histogram to represent a range of observed pixel colors;
   (b) a step for generating observations of pixel color for each sequential image;
   (c) a step for automatically learning a color-based object model using the state estimate and the observations;
   (d) a step for computing a second probability distribution function modeled using a second histogram to represent a background for each image;
   (e) a step for automatically weighting the first and second histograms in relation to the expected relative areas of object and non-object areas, respectively, within each image; and
   (f) a step for automatically tracking each object using the learned color-based model with a color-based tracking function.

2. The method of claim 1 wherein the step for generating the state estimate further comprises a step for determining the probabilistic configurations of each object by performing an initial processing of each sequential image.

3. The method of claim 2 wherein the step for performing an initial processing of each sequential image includes a step for employing a tracking system comprising a tracking function in combination with an object model for probabilistically detecting object configuration information.

4. The method of claim 2 wherein the step for performing an initial processing of each sequential image includes a step for employing a contour-based tracking function in combination with a contour-based object model for probabilistically detecting object configuration information.

5. The method of claim 1 wherein the step for generating the observations of pixel color comprises a step for collecting pixel color information over the entirety of each image.

6. The method of claim 1 wherein the step for generating the observations of pixel color comprises a step for collecting pixel color information over specific portions of each image.

7. The method of claim 6 wherein the step for generating the observations of pixel color includes a step for employing the state estimate to identify specific relevant regions of each image over which pixel color information will be collected.

8. The method of claim 1 further comprising a step for representing the first and second histograms using a Dirichlet function.

9. The method of claim 1 further comprising a step for weighting the first and second histograms using a preliminary color-based model represented by a third probability distribution function modeled using a third histogram.

10. The method of claim 1 wherein the step for automatically learning the color-based object model comprises a step for performing a bin-by-bin comparison between the first histogram and the second histogram.

11. The method of claim 10 wherein bins in the first histogram having values exceeding corresponding bins in the second histogram correspond to those color ranges representing the learned color-based object model.

12. A method for generating a color-based object model, comprising computer program modules for performing the following steps:
   a state estimate module for performing steps for generating a state estimate defining probabilistic states of an object for each of at least one sequential images;
   an observation module for performing steps for generating observations of pixel color for each sequential image; wherein the observations of pixel color are represented by a first probability distribution function modeled using a first histogram;
   a background image module for performing steps for providing a background image for probabilistically representing a known fixed state relative to each image, wherein the background image is represented by a second probability distribution function modeled using a second histogram;
   a first learning module for performing steps for automatically learning a preliminary color-based model for roughly representing each target object using a third probability distribution function modeled using a third histogram; and
   a second learning module for performing steps for automatically learning the color-based object model using the state estimates and the observations.

13. The method of claim 12, further comprising a target configuration module for performing steps for using the learned color-based object model in a tracking system for identifying a configuration of at least one target object in each sequential image.

14. The method of claim 12 wherein the step for generating the state estimate comprises a step for processing each image with an initial object model and an initial tracking function.

15. The method of claim 14 further comprising an object model processing module for performing steps for iteratively replacing the initial object model with the learned color-based object model and for replacing the initial tracking function with a color-based tracking function to improve the accuracy of the learned color-based object model.

16. The method of claim 12 further comprising an color model processing module for performing steps for iteratively replacing the preliminary color-based model with the learned color-based object model to improve the accuracy of the learned color-based object model.

17. A method for identifying the configuration of objects of interest in a scene, comprising performing the following steps:
   an estimate generation step for generating an initial configuration estimate for objects of interest within the scene;
   a model generation step for generating an initial object model and an initial tracking function, and wherein the initial object model is comprised of parameters used by the initial tracking function for determining the configuration of objects within the scene;
   a color identification step for identifying pixel color information within the scene that is relevant to a learned color-based object model, wherein the pixel color information is represented using a probability distribution function modeled by a first Dirichlet function;
   a background image generation step for generating a background image representing the scene using a probability distribution function modeled by a second Dirichlet function;
   a learning step for automatically learning the color-based object model by determining probabilistic relationships between the initial configuration estimates and the pixel color information using a preliminary color-based object model represented by a third Dirichlet function for establishing a probabilistic baseline to assist in learning the learned color-based object model, and,
   a configuration generation step for generating a final configuration estimate for objects of interest in the scene by using the color-based object model in combination with a color-based tracking function.

18. The method of claim 17 wherein the learning step for automatically learning the color-based object model includes steps for automatically scaling the first and second Dirichlet functions based on expected areas of objects of interest in the scene relative to areas of the scene not expected to contain objects of interest.

19. The method of claim 17 wherein the learning step for automatically learning the color-based object model includes steps for using the third Dirichlet function to weight the first and second Dirichlet functions and steps for determining the difference between the first and second Dirichlet functions to generate the learned color-based object model.

20. The method of claim 18 wherein the learning step for automatically learning the color-based object model includes steps for determining the difference between the first and second Dirichlet functions to generate the learned color-based object model.

* * * * *